(12) United States Patent
Kang

(10) Patent No.: US 7,612,854 B2
(45) Date of Patent: Nov. 3, 2009

(54) ARRAY SUBSTRATE FOR IN-PLANE SWITCHING MODE LIQUID CRYSTAL DISPLAY DEVICE AND METHOD OF MANUFACTURING THE SAME

(75) Inventor: Byung-Koo Kang, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 312 days.

(21) Appl. No.: 11/642,875

(22) Filed: Dec. 21, 2006

(65) Prior Publication Data

US 2007/0153202 A1 Jul. 5, 2007

(30) Foreign Application Priority Data

Dec. 29, 2005 (KR) .................. 10-2005-0133553

(51) Int. Cl.
*G02F 1/1343* (2006.01)
*G02F 1/136* (2006.01)

(52) U.S. Cl. ........................... 349/141; 349/42

(58) Field of Classification Search ............. 349/42–48, 349/139–144
See application file for complete search history.

(56) References Cited

U.S. PATENT DOCUMENTS 7,139,058 B2 * 11/2006 Son et al. .................... 349/141

FOREIGN PATENT DOCUMENTS

KR 10-2005-0087552 8/2005

* cited by examiner

*Primary Examiner*—Kevin S Wood
(74) *Attorney, Agent, or Firm*—Holland & Knight LLP

(57) ABSTRACT

A substrate for a liquid crystal display device includes a gate line along a first direction on a substrate, a data line along a second direction and crossing the gate line to define a pixel region, a thin film transistor on the substrate and electrically connected to the gate and data lines, a pixel electrode in the pixel region and connected to the thin film transistor, and a common electrode in the pixel region, a first capacitance between the data line and the common and pixel electrodes at a first side of the data line being substantially equal to a second capacitance between the data line and the common and pixel electrodes at a second side of the data line.

29 Claims, 12 Drawing Sheets

ARRAY SUBSTRATE FOR IN-PLANE SWITCHING MODE LIQUID CRYSTAL DISPLAY DEVICE AND METHOD OF MANUFACTURING THE SAME

The invention claims the benefit of Korean Patent Application No. 2005-0133553 filed in Korea on Dec. 29, 2005, which is hereby incorporated by reference in its entirety.

BACKGROUND OF THE INVENTION

1. Field of the Invention

Embodiments of the invention relates to a flat panel display device, and more particularly, to an in-plane switching ("IPS") mode liquid crystal display device and a method of manufacturing the same. Although embodiments of the invention is suitable for a wide scope of applications, it is particularly suitable for increasing the reliability of an array substrate for an in-plane switching mode liquid crystal display device and a method of manufacturing the same.

2. Discussion of the Related Art

Liquid crystal display ("LCD") devices are driven based on electro-optical characteristics of a liquid crystal material. The liquid crystal material has an intermediate state between a solid crystal and an isotropic liquid. The liquid crystal material is fluid like the isotropic liquid, and molecules of the liquid crystal material are regularly arranged like the solid crystal. An alignment direction of the liquid crystal molecules depends on the intensity or the direction of an electric field applied to the liquid crystal molecules. Light passes through the LCD device along the alignment direction of the liquid crystal molecules. By controlling the intensity or the direction of the electric field, the alignment direction of the liquid crystal molecules changes, and images are generated.

Active matrix liquid crystal display ("AMLCD") devices, which include thin film transistors as switching devices for a plurality of pixels, have been widely used due to their high resolution and ability to display fast moving images. Generally, an LCD device includes two substrates, which are spaced apart and facing each other, and a liquid crystal layer interposed between the two substrates. Each of the substrates includes an electrode facing the other electrode on the other substrate. An electric field is induced between the electrodes by applying a voltage to each electrode. An alignment direction of liquid crystal molecules changes in accordance with a variation in the intensity or the direction of the electric field. The direction of the electric field is perpendicular to the substrates since they are applied to the electrodes on opposing substrates.

An LCD device having an electric field perpendicular to its substrates has relatively high transmittance and a large aperture ratio. However, such an LCD device has narrow viewing angles. To increase viewing angles, various modes have been proposed, such as an in-plane switching ("IPS") mode LCD device.

FIG. 1 is a schematic cross-sectional view illustrating an IPS mode LCD device according to the related art. In FIG. 1, an IPS mode LCD device according to the related art includes a lower substrate 10 and an upper substrate 40, and a liquid crystal layer LC is interposed between the lower substrate 10 and the upper substrate 40. A thin film transistor T, a common electrode 18 and a pixel electrode 30 are formed on the lower substrate 10 at each pixel P. The thin film transistor T includes a gate electrode 14, a semiconductor layer 22, and source and drain electrodes 24 and 26. The semiconductor layer 22 is disposed over the gate electrode 14 with a gate insulating layer 20 therebetween. The source and drain electrodes 24 and 26 are formed on the semiconductor layer 22 and are spaced apart from each other.

The common electrode 18 includes a plurality of portions, and the pixel electrode 30 includes a plurality of parts. The portions of the common electrode 18 and the parts of the pixel electrode 30 are parallel to and spaced apart from each other on the lower substrate 10. The common electrode 18 may be formed of the same material and in the same layer as the gate electrode 14. The pixel electrode 30 may be formed of the same material and in the same layer as the source and drain electrodes 24 and 26. Although not shown in the figure, a gate line is formed along a first side of the pixel P, and a data line is formed along a second side of the pixel P perpendicular to the first side. A common line is further formed on the lower substrate 10. The common line provides the common electrode 18 with a voltage.

A black matrix 42 and a color filter layer 44 are formed on an inner surface of the upper substrate 40. The black matrix 42 is disposed over the gate line, the data line and the thin film transistor T. The color filter layer 44 is disposed at the pixel P. In addition, liquid crystal molecules of the liquid crystal layer LC are driven by a horizontal electric field 35 induced between the common electrode 18 and the pixel electrodes 30. The lower substrate 10 including the thin film transistor T, the common electrode 18 and the pixel electrode 30 may be referred to as an array substrate. The upper substrate 40 including the black matrix 42 and the color filter layer 44 may be referred to as a color filter substrate.

FIG. 2 is a schematic plan view illustrating a pixel region of an array substrate for an IPS mode LCD device according to the related art. In FIG. 2, a gate line 12 is formed on a substrate 10, and a data line 28 crosses the gate line 12 to define a pixel region P. A common line 16 is parallel to and spaced apart from the gate line 12. The common line 16 extends across the pixel region P. A thin film transistor T is formed at a crossing point of the gate line 12 and the data line 28. The thin film transistor T includes a gate electrode 14, a semiconductor layer 22, and source and drain electrodes 24 and 26. The gate electrode 14 is connected to the gate line 12. The semiconductor layer 22 is disposed over the gate electrode 14. The source and drain electrodes 24 and 26 are disposed on the semiconductor layer 22 and are spaced apart from each other.

A common electrode 18 extends from the common line 16 and is formed in the pixel region P. The common electrode 18 includes a plurality of portions, which are parallel to and spaced apart from each other. A pixel electrode 30 is formed in the pixel region P. The pixel electrode 30 includes a plurality of parts, which are parallel to and alternate with the portions of the common electrode 18.

An IPS mode LCD device having the array substrate of the above-mentioned structure has relatively wide viewing angles in a left-right direction with respect to the device, but still has narrow viewing angles in an up-down direction or a diagonal direction with respect to the device. To increase the viewing angles in the up-down or diagonal direction, another structure has been proposed.

FIG. 3 is a schematic plan view illustrating adjacent pixel regions of another array substrate for an IPS mode LCD device according to the related art, and FIG. 4 is a schematic cross-sectional view illustrating the array substrate for an IPS mode LCD device shown in FIG. 3. In FIG. 3, a gate line 52 is formed along a first direction on a substrate 50. A data line 66 is formed along a second direction. The data line 66 crosses the gate line 52 to define a pixel region P. A thin film transistor T is formed at a crossing point of the gate and data lines 52 and 66. A common electrode 56 and a pixel electrode 72 are formed in the pixel region P.

The thin film transistor T includes a gate electrode 54, an active layer 60, a source electrode 62 and a drain electrode 64. The gate electrode 54 is connected to the gate line 52. The active layer 60 is formed over the gate electrode 54 with a gate insulating layer (not shown) therebetween. The source and drain electrodes 62 and 64 are spaced apart from each other over the active layer 60. The source electrode 62 is connected to the data line 66.

The common electrode 56 is formed of the same material and in the same layer as the gate line 52. The gate insulating layer (not shown) and a passivation layer (not shown) are formed between the common electrode 56 and the pixel electrode 72 to prevent the pixel electrode 72 from contacting the common electrode 56. The pixel electrode 72 is formed of a transparent conductive material to increase an aperture ratio. The pixel electrode 72 may be formed of the same material and in the same layer as the source and drain electrodes 62 and 64.

The common electrode 56 includes horizontal portions 56a, a first vertical portion 56b and a second vertical portion 56c. The horizontal portions 56a are formed along the first direction and are spaced apart from each other. The first vertical portion 56b is connected to one ends of the horizontal portions 56a, and the second vertical portion 56c is connected to the other ends of the horizontal portions 56a. The pixel electrode 72 includes horizontal parts 72a, a first vertical part 72b, and a second vertical part 72c. The horizontal parts 72a are formed along the first direction and alternate with the horizontal portions 56a. The first vertical part 72b is connected to one ends of the horizontal parts 72a, and the second vertical part 72c is connected to the other ends of the horizontal parts 72a.

Since the common electrode 56 and the pixel electrode 72 are arranged along the first direction, that is, substantially horizontally, the viewing angles are increased in the up-down direction. If the common and pixel electrodes 56 and 72 are inclined with a predetermined angle with respect to the first direction, the viewing angles may be increased in the diagonal direction.

However, the common electrode 56 and the pixel electrode 72 are formed in difference layers, and the common electrode 56 and the pixel electrode 72 may be misaligned during respective processes. The misalignment lowers image qualities of the device. As shown in FIG. 4, horizontal portions 56a of a common electrode are formed on a substrate 50. A gate insulating layer 58 and a passivation layer 68 are sequentially formed on the horizontal portions 56a of the common electrode. Horizontal parts 72a of a pixel electrode are formed on the passivation layer 68. Each of the horizontal parts 72a is disposed between adjacent horizontal portions 56a.

After the horizontal portions 56a are patterned through a mask process, the horizontal parts 72a of the pixel electrode are patterned through another mask process. Each mask process includes a light-exposing step. A substrate is repeatedly exposed to light, moving with respect to a mask because the mask is relatively very small in comparison with the substrate. Thus, during the light-exposing step, the mask may be misaligned with the substrate.

Thus, there may not be a misalignment in a first area NA. However, when a second area ANA is exposed to light in order to form the pixel electrode, the mask may be misaligned with the substrate 50. Hence, a distance L1 between the common electrode and the pixel electrode in the first area NA is not equal to a distance L2 between the common electrode and the pixel electrode. Accordingly, the quality of displayed images is not uniform in some areas. Moreover, since the common electrode is formed of an opaque material, the brightness of the device is relatively low.

SUMMARY OF THE INVENTION

Accordingly, embodiments of the invention is directed to an in-plane switching ("IPS") mode liquid crystal display device and a method of manufacturing the same that substantially obviate one or more of the problems due to limitations and disadvantages of the related art.

An object of embodiments of the invention is to provide an in-plane switching ("IPS") mode liquid crystal display device and a method of manufacturing the same that have uniform quality in displayed images.

Another object of embodiments of the invention is to provide an in-plane switching ("IPS") mode liquid crystal display device and a method of manufacturing the same that have high brightness.

Another object of embodiments of the invention is to provide an in-plane switching ("IPS") mode liquid crystal display device and a method of manufacturing the same that prevent flicker or vertical line defects in displayed images.

Another object of embodiments of the invention is to provide an in-plane switching ("IPS") mode liquid crystal display device and a method of manufacturing the same that have increased viewing angles in the up-down direction.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a substrate for a liquid crystal display device includes a substrate, a gate line along a first direction on the substrate, a data line along a second direction on the substrate, the data line crossing the gate line to define a pixel region, the pixel region having first and second sides opposing one another and first and second areas along the second direction, a thin film transistor on the substrate, the thin film transistor electrically connected to the gate and data lines, a pixel electrode on the substrate and electrically connected to the thin film transistor, the pixel electrode including a first vertical part and a second vertical part, the first vertical part at the first side within the first area and the second vertical part at the second side within the second area, and a common electrode on the substrate, the common electrode including a first vertical portion and a second vertical portion, the first vertical portion at the first side within the second area and the second vertical portion at the second side within the first area.

In another aspect, a substrate for a liquid crystal display device includes a substrate, gate lines along a first direction on the substrate, data lines along a second direction on the substrate, the data lines crossing the gate lines to define pixel regions, each of the pixel regions having first and second areas along the second direction, a thin film transistor on the substrate at each crossing point of the gate and data lines, a pixel electrode on the substrate in each of the pixel regions, the pixel electrode electrically connected to the thin film transistor and including a first vertical part and a second vertical part, and a common electrode on the substrate in each of the pixel regions, the common electrode including a first vertical portion and a second vertical portion, the first vertical part and the first vertical portion at a first side of each of the data lines, and the second vertical part and the second vertical portion at a second side of each of the data lines.

In another aspect, a substrate for a liquid crystal display device includes a substrate, a gate line along a first direction on the substrate, a data line along a second direction and crossing the gate line to define a pixel region, a thin film transistor on the substrate and electrically connected to the gate and data lines, a pixel electrode in the pixel region and connected to the thin film transistor, and a common electrode in the pixel region, wherein a first capacitance between the data line and the common and pixel electrodes at a first side of the data line is substantially equal to a second capacitance between the data line and the common and pixel electrodes at a second side of the data line.

In another aspect, a method of manufacturing a substrate for a liquid crystal display device includes forming a gate line along a first direction on a substrate, forming a data line along a second direction, the data line crossing the gate line to define a pixel region, the pixel region having first and second sides opposing one another and first and second areas along the second direction, forming a thin film transistor electrically connected to the gate and data lines, forming a first vertical part of a pixel electrode on the substrate at the first side within the first area, forming a second vertical part of the pixel electrode on the substrate at the second side within the second area, the pixel electrode electrically connected to the thin film transistor, forming a first vertical portion of a common electrode on the substrate at the first side within the second area, and forming a second vertical portion of the common electrode on the substrate at the second side within the first area.

In another aspect, a method of manufacturing a substrate for a liquid crystal display device includes forming a gate line, a gate electrode, and a common line on a substrate, the gate line and the common line extending along a first direction, forming a gate insulating layer on the gate line, the gate electrode and the common line, forming an active layer and an ohmic contact layer on the gate insulating layer over the gate electrode, forming a data line, a source electrode and a drain electrode on the ohmic contact layer, the data line extending along a second direction and crossing the gate line to define a pixel region, the pixel region including first and second areas along the second direction, forming a passivation layer covering the data line, the source electrode and the drain electrode, the passivation layer including a first contact hole and second contact holes, the first contact hole exposing the drain electrode, the second contact holes exposing the common line, and forming a pixel electrode and a common electrode in the pixel region on the passivation layer, the pixel electrode including a first vertical part and a second vertical part, the common electrode including a first vertical portion and a second vertical portion, wherein the first vertical part and the first vertical portion are formed at a first side of the data line, and the second vertical part and the second vertical portion are formed at a second side of the data line.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
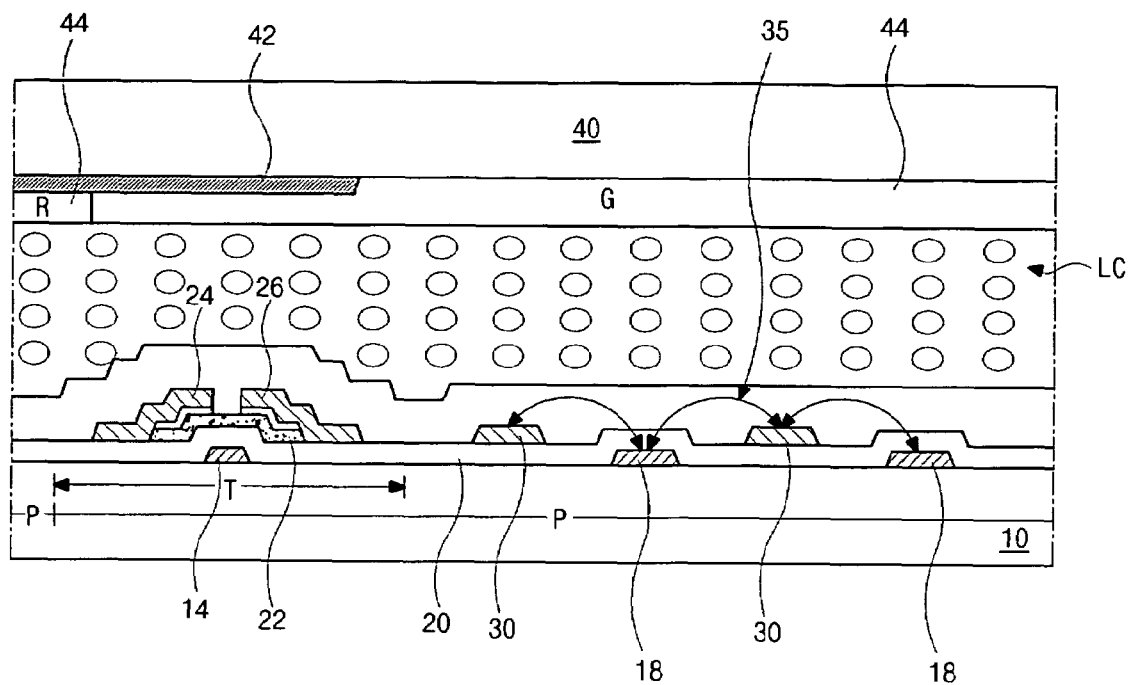
FIG. 1 is a schematic cross-sectional view illustrating an IPS mode LCD device according to the related art.
Figure 2:
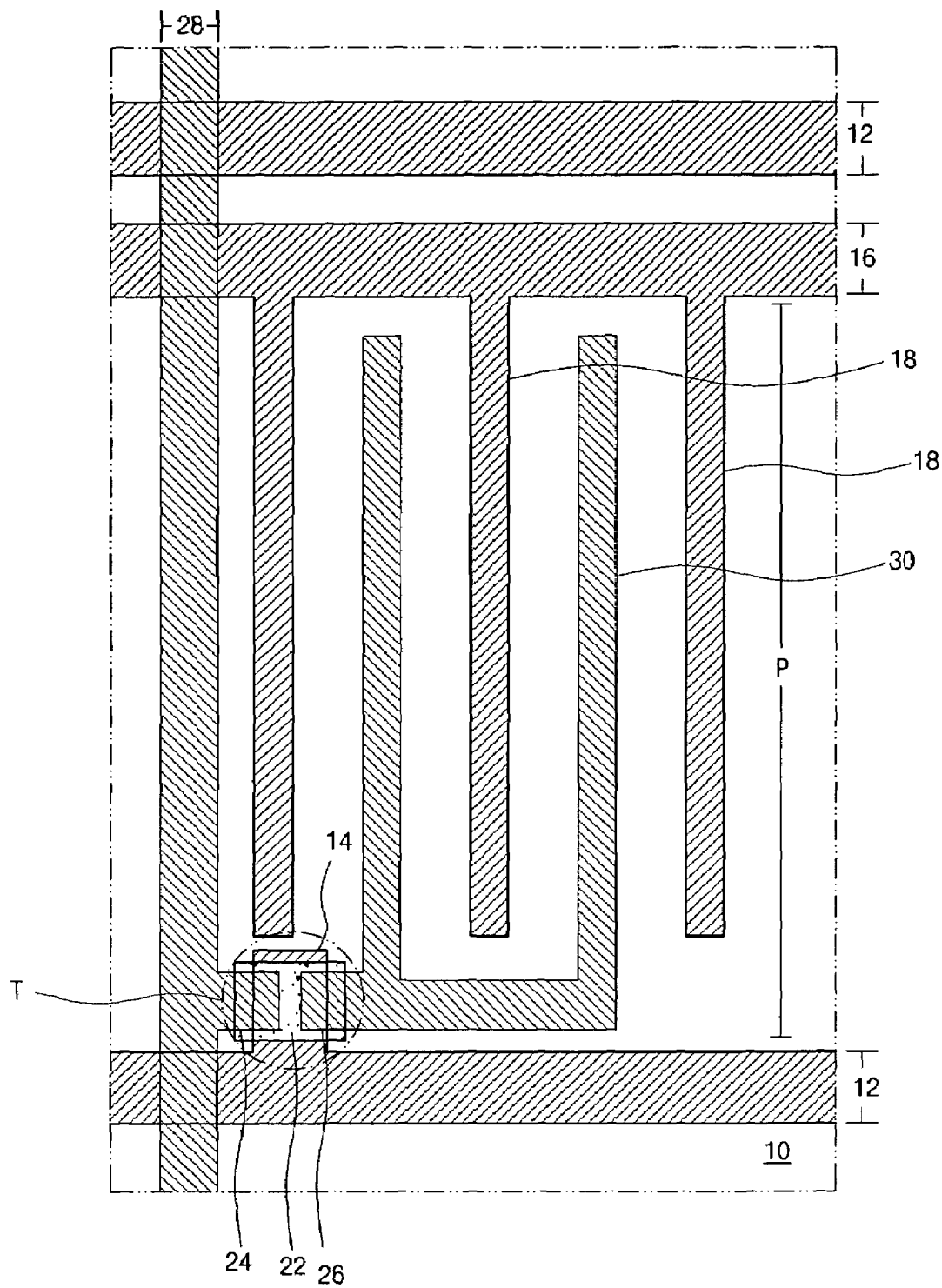
FIG. 2 is a schematic plan view illustrating a pixel region of an array substrate for an IPS mode LCD device according to the related art.
Figure 3:
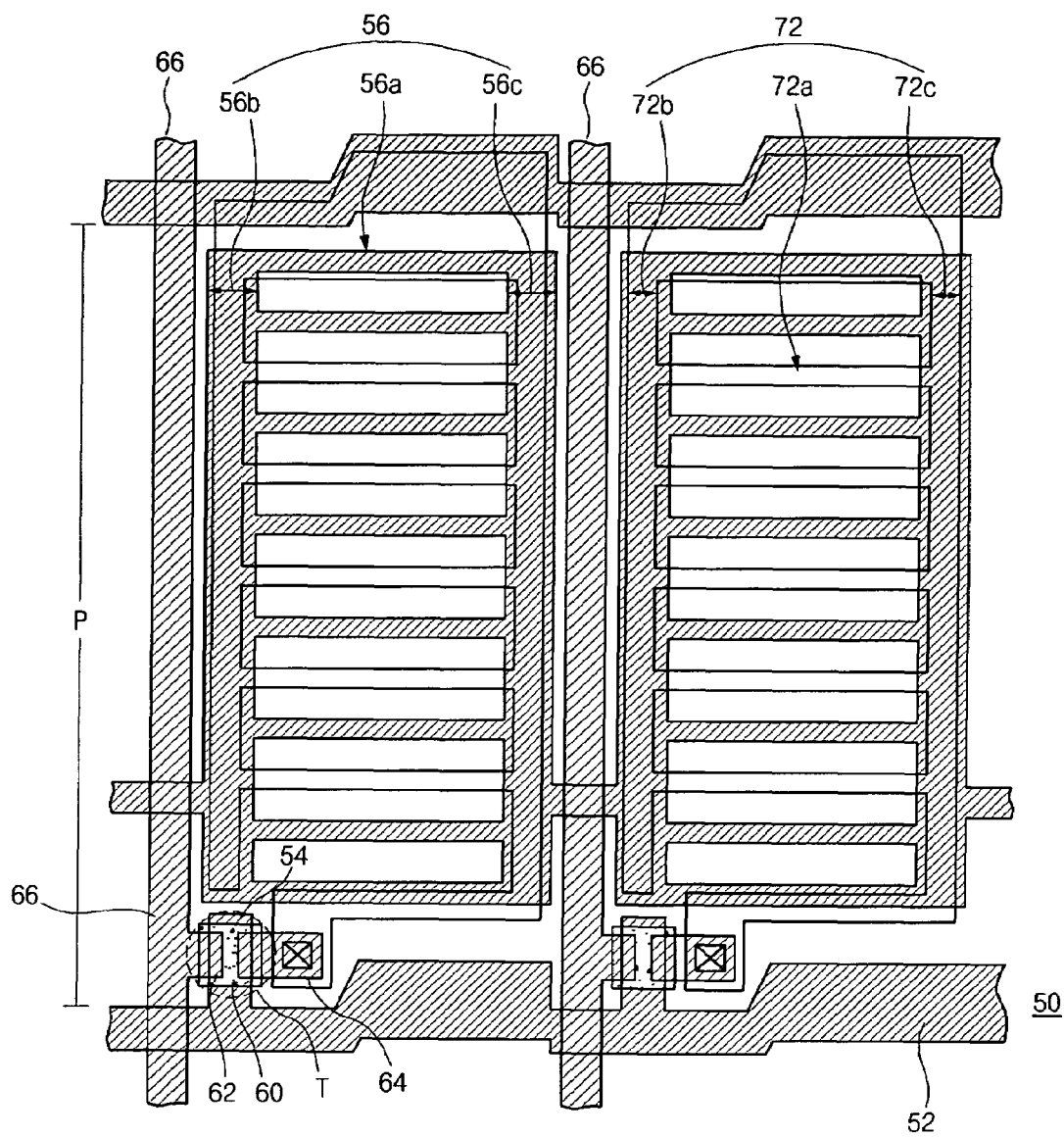
FIG. 3 is a schematic plan view illustrating adjacent pixel regions of another array substrate for an IPS mode LCD device according to the related art.
Figure 4:
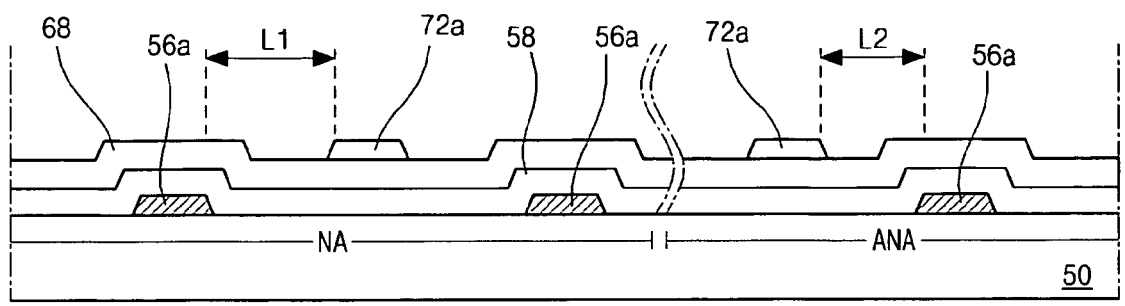
FIG. 4 is a schematic cross-sectional view illustrating the array substrate for an IPS mode LCD device shown in FIG. 3.
Figure 5:
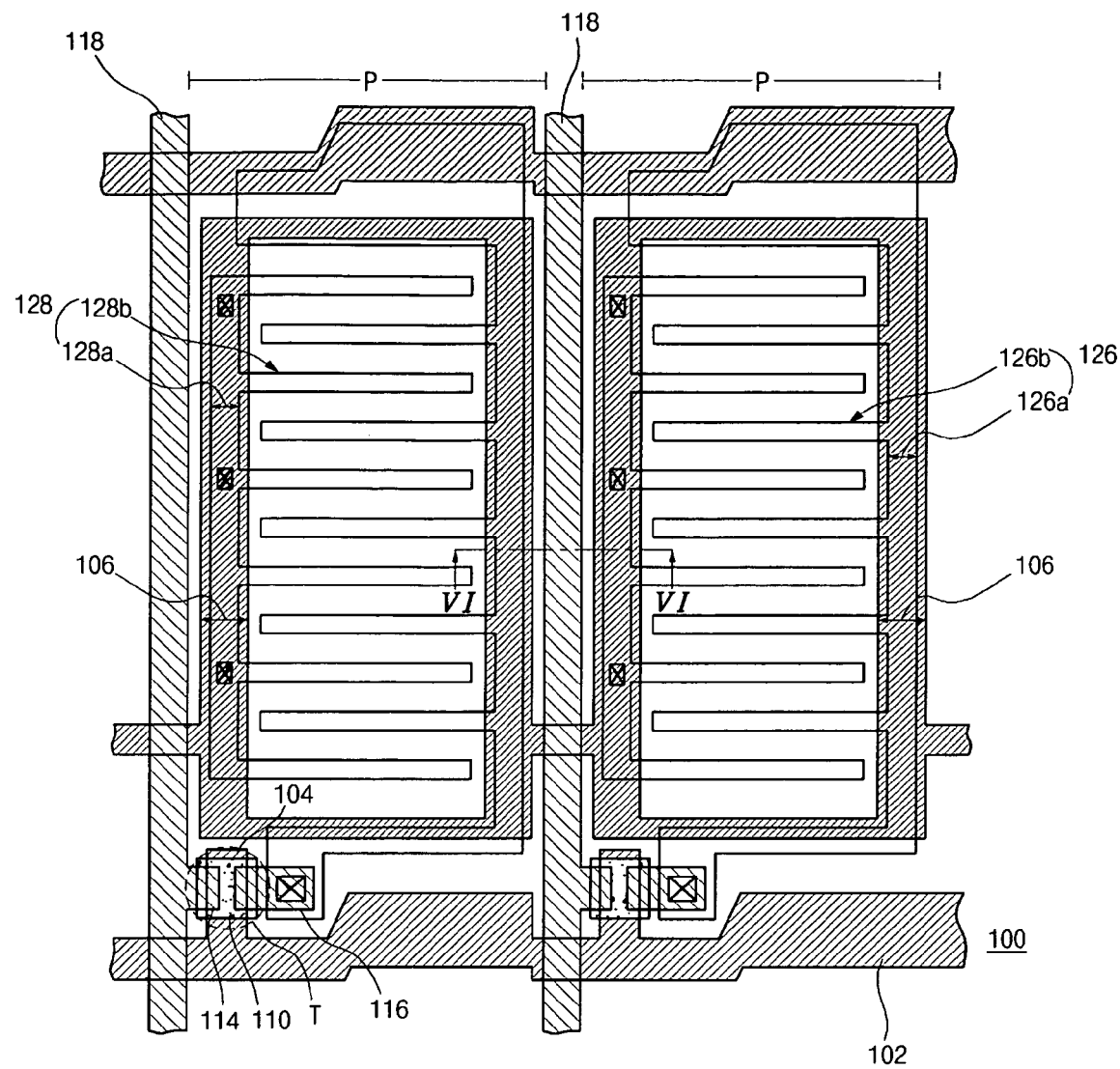
FIG. 5 is a schematic plan view illustrating adjacent pixel regions of an array substrate for an IPS mode LCD device according to an embodiment of the invention.
Figure 6:
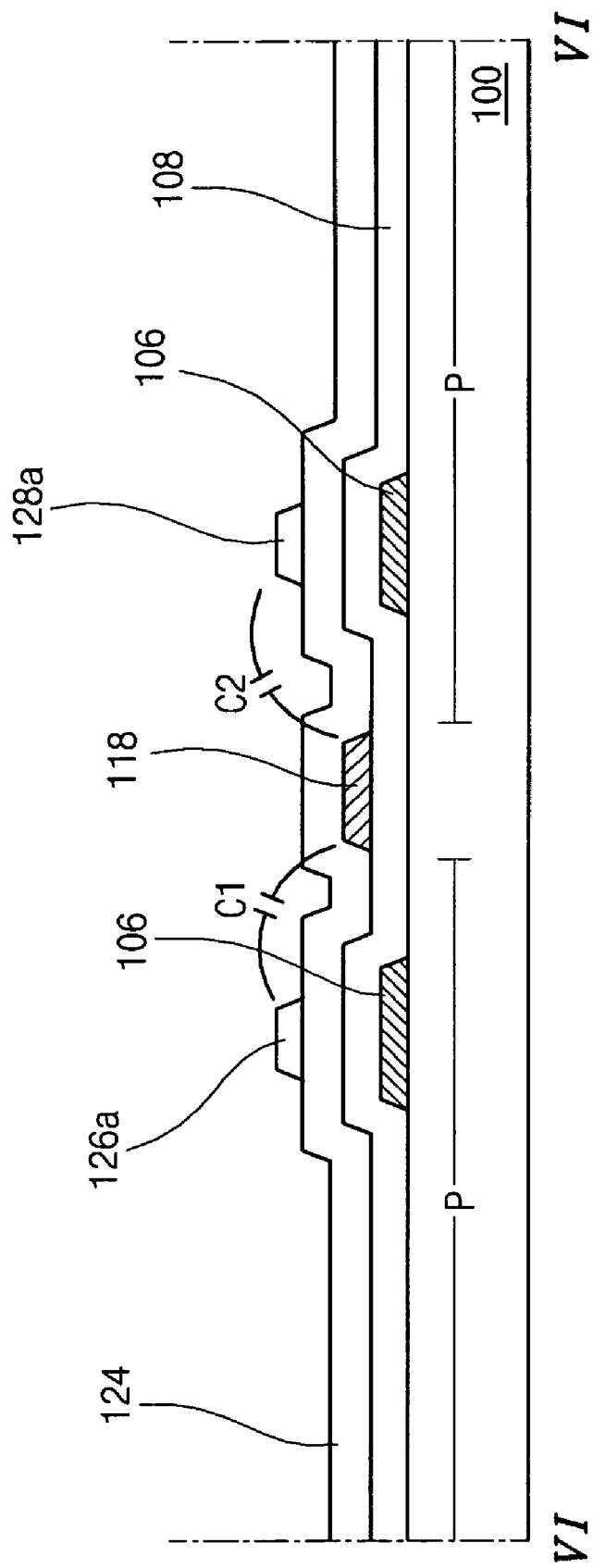
FIG. 6 is a schematic cross-sectional view illustrating the array substrate along line VI-VI shown in FIG. 5.

FIG. 5 is a schematic plan view illustrating adjacent pixel regions of an array substrate for an IPS mode LCD device according to an embodiment of the invention, and FIG. 6 is a schematic cross-sectional view illustrating the array substrate along line VI-VI shown in FIG. 5. In FIG. 5, an array substrate includes gate lines 102 formed along a first direction and data lines 118 formed along a second direction crossing the first direction on a substrate 100. The gate lines 102 and the data lines 118 cross each other to define pixel regions P. A thin film transistor T is formed at each crossing point of the gate lines 102 and the data lines 118. The thin film transistor T is connected to the gate and data lines 102 and 118. The thin film transistor T includes a gate electrode 104, an active layer 110, a source electrode 114 and a drain electrode 116.

In addition, a common line 106 is formed on the substrate 100. The common line 106 may be formed in the same layer as the gate line 102. In addition, the common line 106 may include a loop portion along the perimeter of each of the pixel regions P and the loop portion may be substantially rectangular corresponding to the shape of each of the pixel regions P. The loop portions of adjacent pixel regions P are connected to each other along the first direction. Although not shown, the common line 106 may have non-rectangular shapes.

Further, a common electrode 128 and a pixel electrode 126 are formed in each of the pixel regions P. The common electrode 128 is electrically connected to the common line 106 via contact holes, and the pixel electrode 126 is electrically connected to the drain electrode 116 via a drain contact hole. Thus, common signals may be applied to the common electrode 128 through the common line 106, and image signals may be applied to the pixel electrode 126 through the drain electrode 116 of the thin film transistor T.

The common electrode 128 includes a vertical portion 128a and horizontal portions 128b. The vertical portion of the common electrode 128a is disposed at a first side of the pixel region P along the second direction, and the horizontal portions of the common electrode 128b extend from the vertical portion 128a along the first direction. The pixel electrode 126 also includes a vertical portion 126a and horizontal portions 126b. The vertical portion of the pixel electrode 126a is disposed at a second side of the pixel region P along the second direction, and the horizontal portions of the pixel electrode 126b extend from the vertical portion 126a along the first direction. The second side of the pixel region P is directly opposite to the first side of the pixel region P, and the horizontal portions of the pixel electrode 126b may alternate with the horizontal portions of the common electrode 128b along the second direction.

The pixel electrode 126 and the common electrode 128 may be formed in the same layer. Therefore, although the mask for forming the pixel electrode 126 and the common electrode 128 may be misaligned with the substrate 100, distances between the horizontal portions of the pixel electrode 126b and the horizontal portions of the common electrode 128b are kept uniform. Moreover, the pixel electrode 126 and the common electrode 128 may be formed of a transparent conductive material. Thus, the aperture ratio is increased, and the brightness of the device is improved.

When the common electrode 128 and the pixel electrode 126 are formed of a transparent conductive material and in the same layer, the common electrode 128 and the pixel electrode 126 are arranged to not overlap each other, to thereby avoid a short circuit therebetween. For example, the vertical portion of the common electrode 128a is disposed the first side of the pixel region P, the vertical portion of the pixel electrode 126a is disposed the second side of the pixel region P, and the horizontal portions of the common electrode 128b and the horizontal portions of the pixel electrode 126b alternate with and are spaced apart from each other. Thus, the common electrode 128 and the pixel electrode 126 do not overlap each other.

When the common electrode 128 is disposed at one side of the data line 118 and the pixel electrode 126 is disposed at the other side of the data line 118, the capacitance between the data line 118 and the common electrode 128 and the capacitance between the data line 118 and the pixel electrode 126 may be different. Thus, flicker may occur or vertical line defects may be shown in the displayed images.

As shown in FIG. 6, the common line 106 is formed on the substrate 100 and includes a portion in each of the pixel regions P. Although not shown in the figure, the portions of the common line 106 are connected to each other. A gate insulating layer 108 is formed on the common line 106. A data line 118 is formed between adjacent pixel regions P on the gate insulating layer 108. The data line 118 is disposed between the portions of the common line 106.

A passivation layer 124 is formed on the data line 118. A common electrode 128 and a pixel electrode 126 are formed on the passivation layer 124. The common electrode 128 includes a vertical portion 128a, and the pixel electrode 126 includes a vertical portion 126a. The vertical portion of the pixel electrode 126a is disposed at one side of the data line 118, and the vertical portion of the common electrode 128a is disposed at the other side of the data line 118. The vertical portion of the pixel electrode 126a and the vertical portion of the common electrode 128a respective overlap different portions of the common line 106.

There exist parasitic capacitances C1 and C2 between the data line 118 and the vertical portion of the pixel electrode 126a and between the data line 118 and the vertical portion of the common electrode 128a. Since signals provided to the common electrode 128 and the pixel electrode 126 are generally different from one another, the parasitic capacitances C1 and C2 are not equal. The difference in the parasitic capacitances C1 and C2 affects the pixels and causes flicker or vertical line defects. Thus, the images are not uniform, and image quality is lowered.

Figure 7:
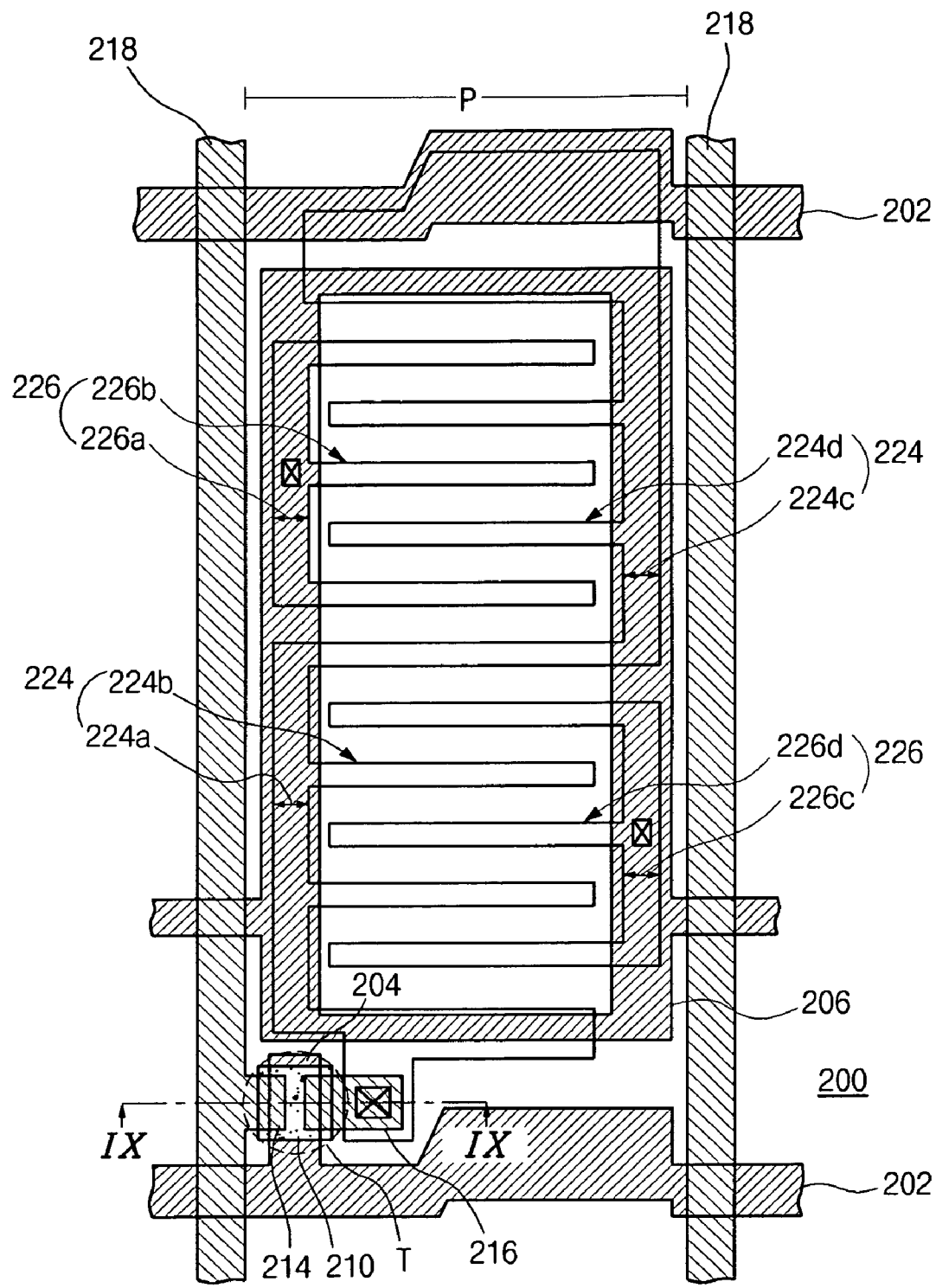
FIG. 7 is a schematic plan view illustrating an array substrate for an IPS mode LCD device according to another embodiment of the invention.

FIG. 7 is a schematic plan view illustrating an array substrate for an IPS mode LCD device according to another embodiment of the invention. In FIG. 7, an array substrate includes gate lines 202 formed along a first direction and data lines 218 formed along a second direction crossing the first direction on a substrate 200. The gate lines 202 and the data lines 218 cross each other to define pixel regions P. A thin film transistor T is formed at each crossing point of the gate lines 202 and the data lines 218. The thin film transistor T is connected to the gate and data lines 202 and 218. The thin film transistor T includes a gate electrode 204, an active layer 210, a source electrode 214 and a drain electrode 216.

In addition, a common line 206 is formed on the substrate 200. The common line 206 may be formed in the same layer as the gate line 202. In addition, the common line 206 may include a loop portion along the perimeter of each of the pixel regions P and the loop portion may be substantially rectangular corresponding to the shape of each of the pixel regions P. The loop portions of adjacent pixel regions P are connected to each other along the first direction. Although not shown, the common line 206 may have non-rectangular shapes. The common line 206 is close to the data line 218 with the minimum distance.

Further, a common electrode 226 and a pixel electrode 224 are formed in each of the pixel regions P. The common electrode 226 is electrically connected to the common line 206 via contact holes, and the pixel electrode 224 is electrically connected to the drain electrode 216 via a drain contact hole. Thus, common signals may be applied to the common electrode 226 through the common line 206, and image signals may be applied to the pixel electrode 224 through the drain electrode 216 of the thin film transistor T. The pixel electrode 224 and the common electrode 226 are formed in the same layer and are formed of a transparent conductive material.

Moreover, the common electrode 226 includes a first vertical portion 226a, first horizontal portions 226b, a second vertical portion 226c, and second horizontal portions 226d. The pixel electrode 224 includes a first vertical portion 224a, first horizontal portions 224b, a second vertical portion 224c, and second horizontal portions 224d. The first vertical portion and the first horizontal portions of the common electrode 226a and 226b, and the second vertical portion and the second horizontal portions of the pixel electrode 224c and 224d may be disposed in an upper area of the pixel region P in the context of the figure. The second vertical portion and the second horizontal portions of the common electrode 226c and 226d, and the first vertical portion and the first horizontal portions of the pixel electrode 224a and 224b may be disposed in a lower area of the pixel region P in the context of the figure.

The first vertical portion of the common electrode 226a is disposed at a first side of the pixel region P along the second direction, and the first horizontal portions of the common electrode 226b extend from the first vertical portion of the common electrode 226a along the first direction. The second vertical portion of the common electrode 226c is disposed at a second side of the pixel region P, which is opposite to the first side of the pixel region P, along the second direction, and the second horizontal portions of the common electrode 226d extend from the second vertical portion of the common electrode 226c along the first direction.

In addition, the first vertical portion of the pixel electrode 224a is disposed at the first side of the pixel region P, and the first horizontal portions of the pixel electrode 224b extend from the first vertical portion of the pixel electrode 224a along the first direction. The second vertical portion of the pixel electrode 224c is disposed at the second side of the pixel region, and the second horizontal portions of the pixel electrode 224d extend from the second vertical portion of the pixel electrode 224c along the first direction. The first horizontal portions of the common electrode 226b alternate with the second horizontal portions of the pixel electrode 224d, and the second horizontal portions of the common electrode 226d alternate with the first horizontal portions of the pixel electrode 224b.

The common line 206 may overlap the first and second vertical portions of the common electrode 226a and 226c, the first and second vertical portions of the pixel electrode 224a and 224c, and the outer ones of the first and second horizontal portions of the pixel electrode 224b and 224d. The first and second vertical portions of the common electrode 226a and 226c contact the common line 206 via contact holes. The first and second vertical portions of the common electrode 226a and 226c and the first and second horizontal portions of the common electrode 226b and 226d receive the same signal from the common line 206. The first and second horizontal portions of the pixel electrode 224b and 224d have at least one portion in common. The first and second vertical portions of the pixel electrode 224a and 224c and the first and second horizontal portions of the pixel electrode 224b and 224d receive the same signal from the drain electrode 218 via a drain contact hole.

The first vertical portion of the common electrode 226a and the first vertical portion of the pixel electrode 224a are sequentially disposed at one side of the data line 218 along the second direction. The second vertical portion of the pixel electrode 224c and the second vertical portion of the common electrode 226c are sequentially disposed at the other side of the data line 218 along the second direction. Accordingly, parasitic capacitances are equal at both sides of the data line 118.

Figure 8:
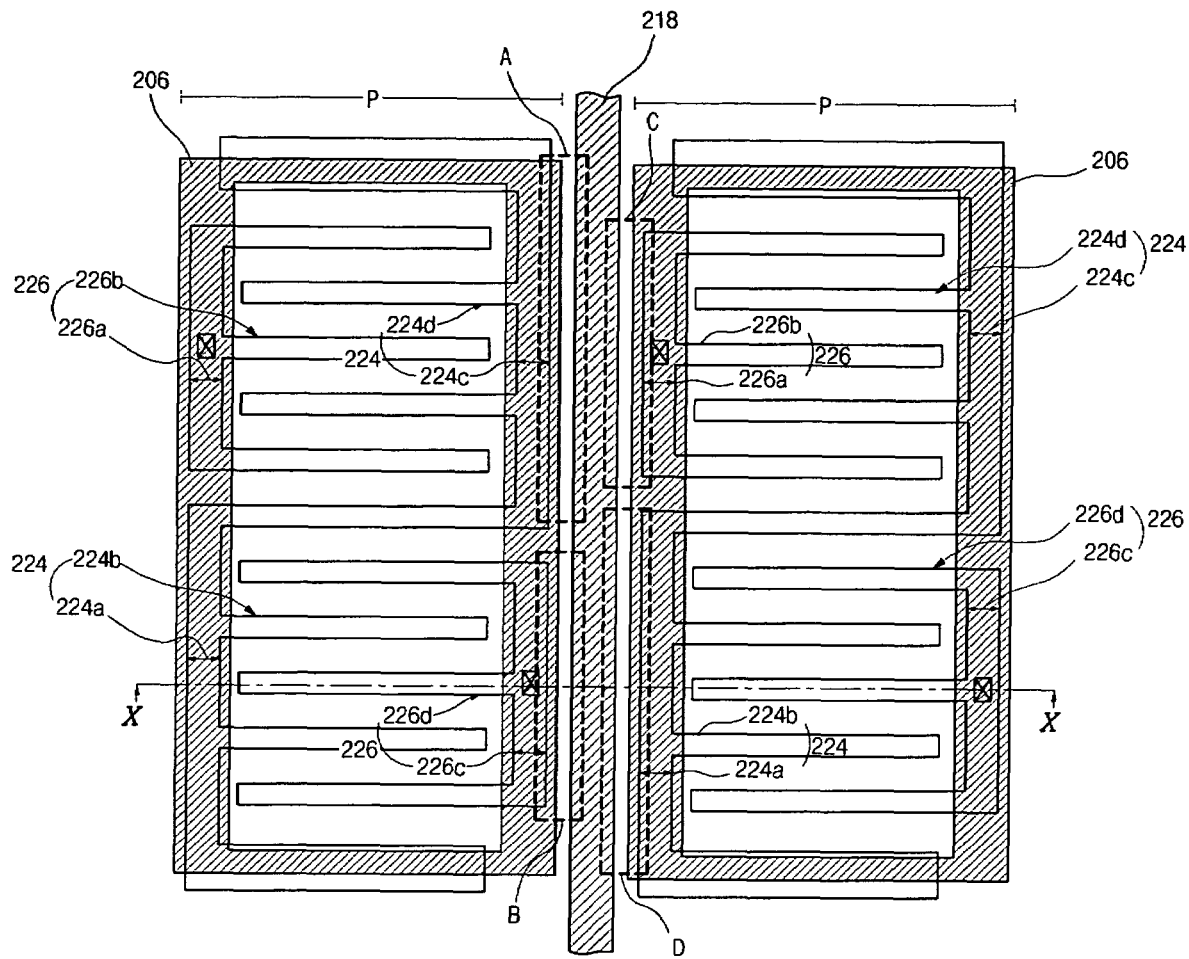
FIG. 8 is a schematic plan view illustrating parasitic capacitances in an array substrate shown in FIG. 7.

FIG. 8 is a schematic plan view illustrating parasitic capacitances in an array substrate shown in FIG. 7. In FIG. 8, the data line 218 is disposed between the pixel regions P adjacent along the first direction. The second vertical portion of the pixel electrode 224c and the second portion of the common electrode 226c may be sequentially disposed at the left side of the data line 218 along the second direction in the context of the figure. The first vertical portion of the common electrode 226a and the first vertical portion of the pixel electrode 224a may be sequentially disposed at the right side of the data line 218 along the second direction in the context of the figure.

Thus, there exists a first parasitic capacitance between the data line 218 and the second vertical portion of the pixel electrode 224c at a first region A, which corresponds to an upper-left side of the data line 218. In addition, there exists a second parasitic capacitance between the data line 218 and the second vertical portion of the common electrode 226c at a second region B, which corresponds to a lower-left side of the data line 218. Further, there exists a third parasitic capacitance between the data line 218 and the first vertical portion of the common electrode 226a at a third region C, which corresponds to an upper-right side of the data line 218. Moreover, there exists a fourth parasitic capacitance between the data line 218 and the first vertical portion of the pixel electrode 224a at a fourth region D, which corresponds to a lower-right side of the data line 218. The sum of the first and second parasitic capacitances at the first and second regions A and B is equal to the sum of the third and fourth parasitic capacitances at the third and fourth regions C and D. Accordingly, since the parasitic capacitances are the same at both sides of the data line, the flicker or vertical line defects are prevented.

Figure 9A:
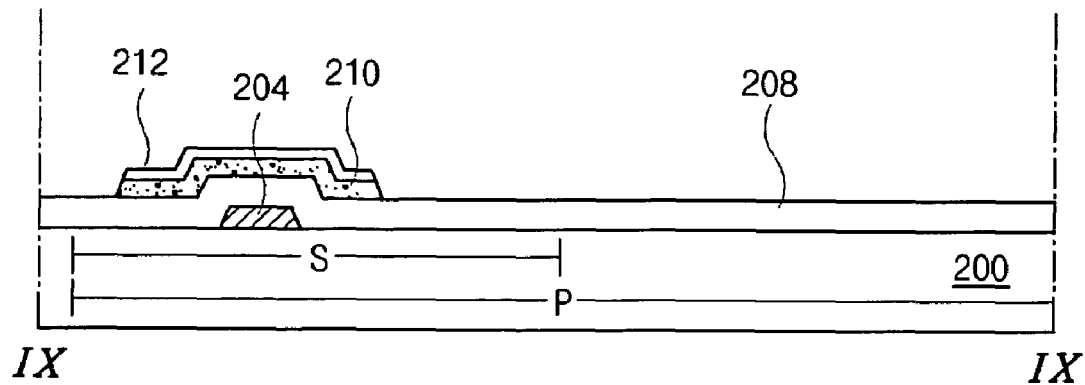
FIGS. 9A to 9D are schematic cross-sectional views illustrating a method of manufacturing an array substrate for the IPS mode LCD device shown in FIG. 7 along line IX-IX according to an embodiment of the invention.
Figure 9B:
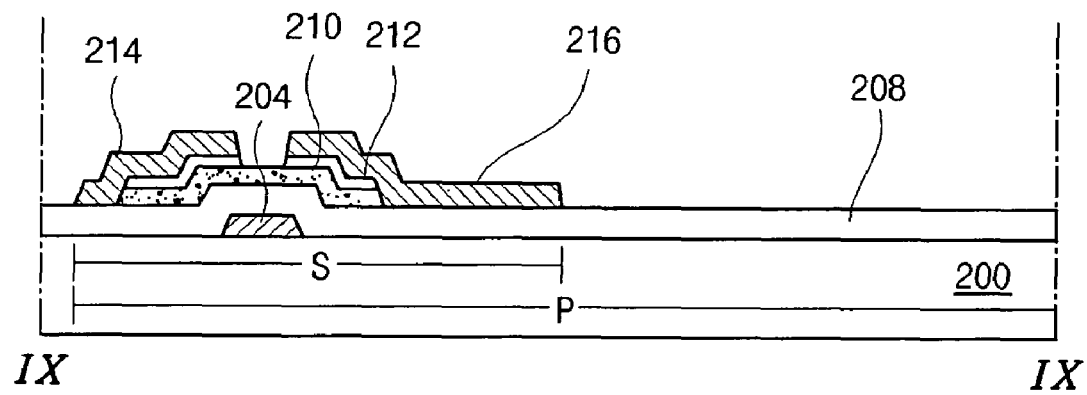
Figure 9C:
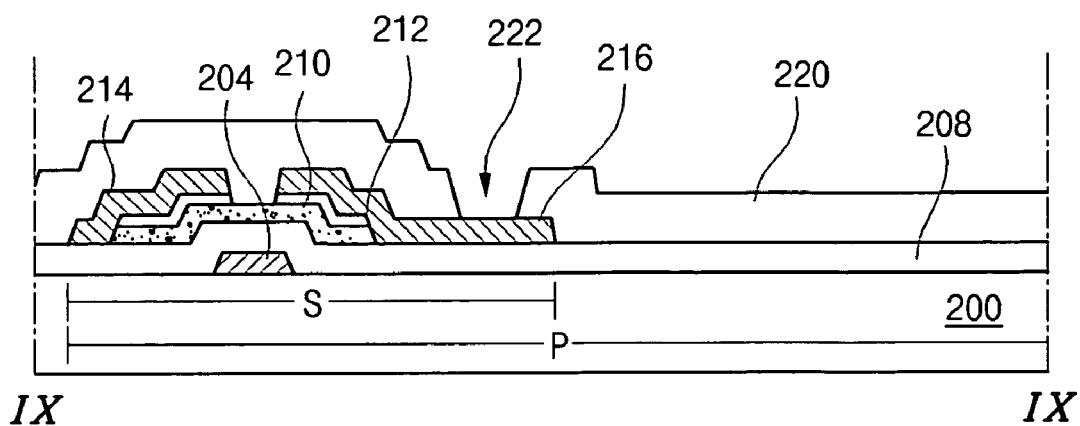
Figure 9D:
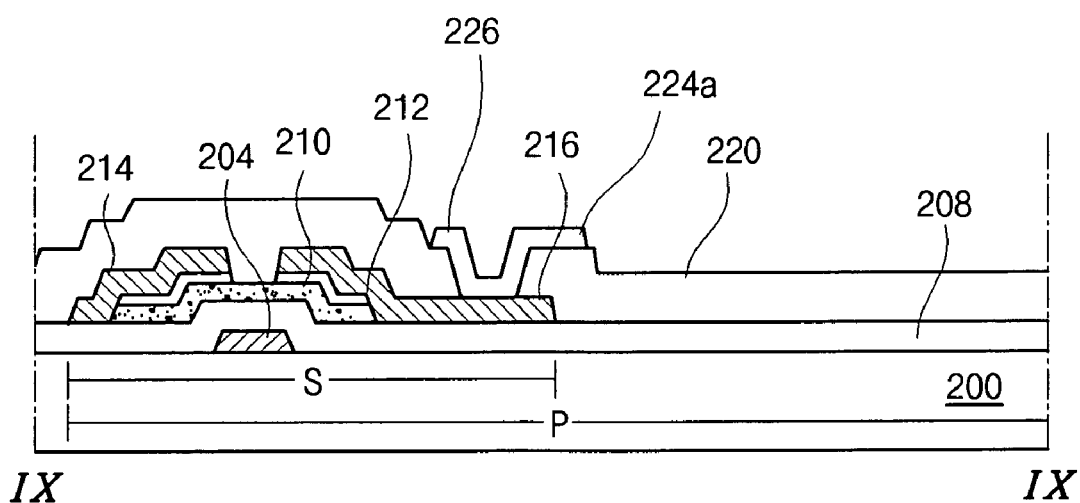
Figure 10A:
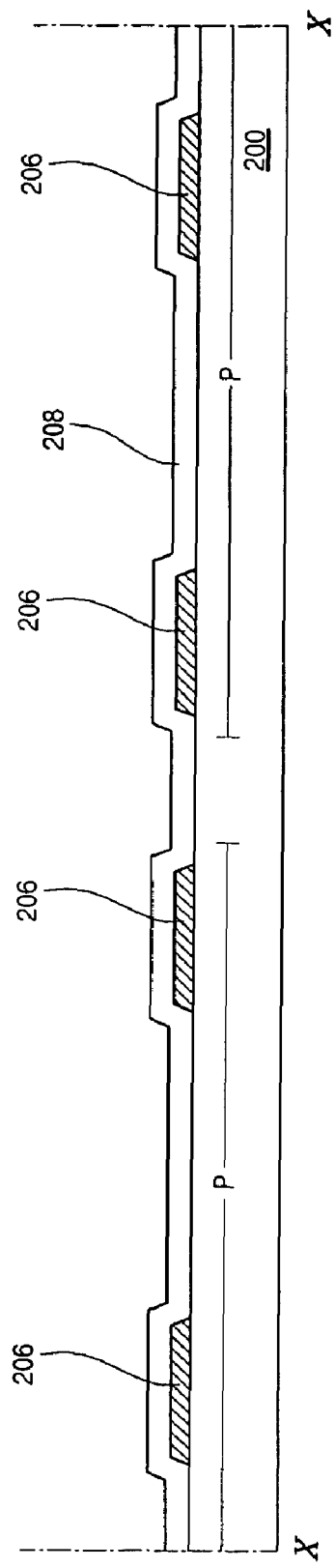
FIGS. 10A to 10D are schematic cross-sectional views illustrating a method of manufacturing an array substrate for the IPS mode LCD device shown in FIG. 8 along line X-X according to another embodiment of the invention.

FIGS. 9A to 9D are schematic cross-sectional views illustrating a method of manufacturing an array substrate for the IPS mode LCD device shown in FIG. 7 along line IX-IX according to an embodiment of the invention, and FIGS. 10A to 10D are schematic cross-sectional views illustrating a method of manufacturing an array substrate for the IPS mode LCD device shown in FIG. 8 along line X-X according to another embodiment of the invention. As shown in FIG. 9A and FIG. 10A, a gate line 202 and a gate electrode 204 are formed on a substrate 200, on which pixel regions P and switching regions S are defined. Each of the pixel regions P may overlap one switching region S. Although not shown, the gate line 202 are formed to extend along a first direction, and the gate electrode 204 is connected to the gate line 202. A common line 206 is also formed on the substrate 200. The common line 206 includes portions along peripheries of each pixel region P. The portions of the common line 206 of adjacent pixel regions P are connected to one another.

A gate insulating layer 208 may be formed substantially on an entire surface of the substrate 200 including the gate line 202, the gate electrode 204, and the common line 206 by depositing an inorganic insulating material. The gate insulating layer 208 may include one of silicon nitride ($SiN_x$) and silicon oxide ($SiO_2$). In addition, an active layer 210 and an ohmic contact layer 212 are formed on the gate insulating layer 208 over the gate electrode 204 by depositing intrinsic amorphous silicon (a-Si:H) and impurity-doped amorphous silicon (for example, n+ a-Si:H) substantially on an entire surface of the substrate 200 including the gate insulating layer 208 and patterning the deposited silicon.

Figure 10B:
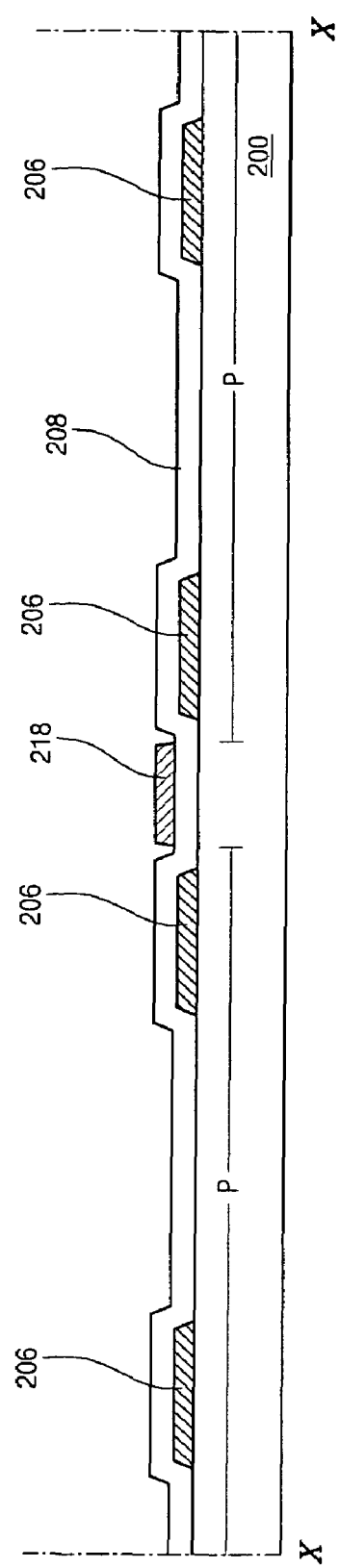

As shown in FIG. 9B and FIG. 10B, source and drain electrodes 214 and 216 are formed on the ohmic contact layer 212 by depositing a conductive material substantially on an entire surface of the substrate 200 including the active layer 210 and the ohmic contact layer 212 and then patterning the deposited conductive material. The source and drain electrodes 214 and 216 are spaced apart from each other. A data line 218 may be formed simultaneously with the source and drain electrodes 214 and 216. The data line 218 is connected to the source electrode 214. Although not shown in the figure, the data line 218 is formed to extend along a second direction and crosses the gate line 202 to define the pixel region P. The conductive material may include one or more of a conductive metallic group including aluminum (Al), an aluminum alloy such as aluminum neodymium (AlNd), chromium (Cr), tungsten (W), molybdenum (Mo), titanium (Ti) and moly-tungsten (MoW). Subsequently, a part of the ohmic contact layer 212 is removed between the source and drain electrodes 214 and 216, thereby exposing the active layer 210.

Figure 10C:
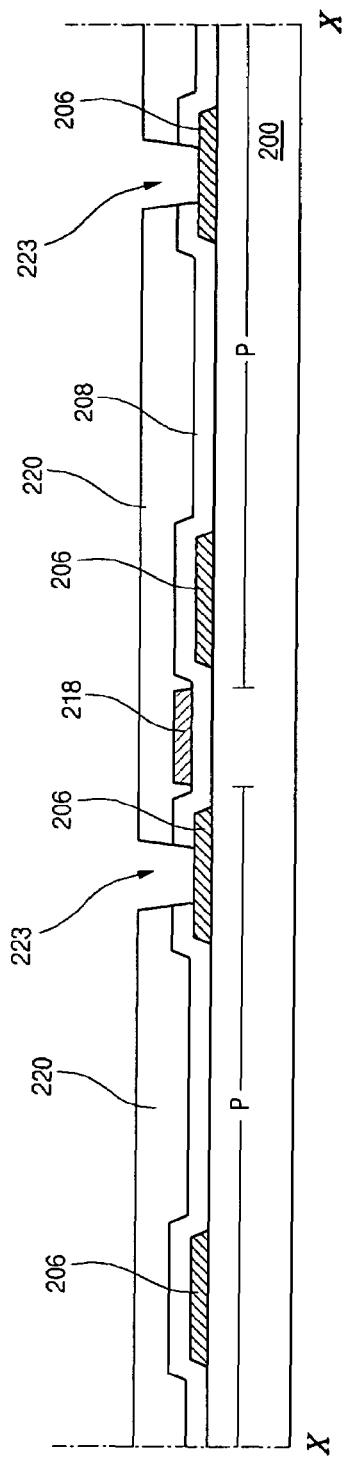

As shown in FIG. 9C and FIG. 10C, a passivation layer 220 is formed substantially on an entire surface of the substrate 200 including the source and drain electrodes 214 and 216 by depositing one selected from an inorganic insulating material group including silicon nitride ($SiN_x$) and silicon oxide ($SiO_2$) or coating the substrate 200 with one or more selected from an organic insulating material group including benzocyclobutene (BCB) and acrylic resin. The passivation layer 220 is patterned to form a drain contact hole 222 and common line contact holes 223. The drain contact hole 222 exposes a part of the drain electrode 216, and the common line contact holes 223 respective expose a part of the common line 206. Although not shown in the figure, in each pixel region P, the common line contact holes 223 may be disposed at opposite sides of the pixel region P along a diagonal direction.

Figure 10D:
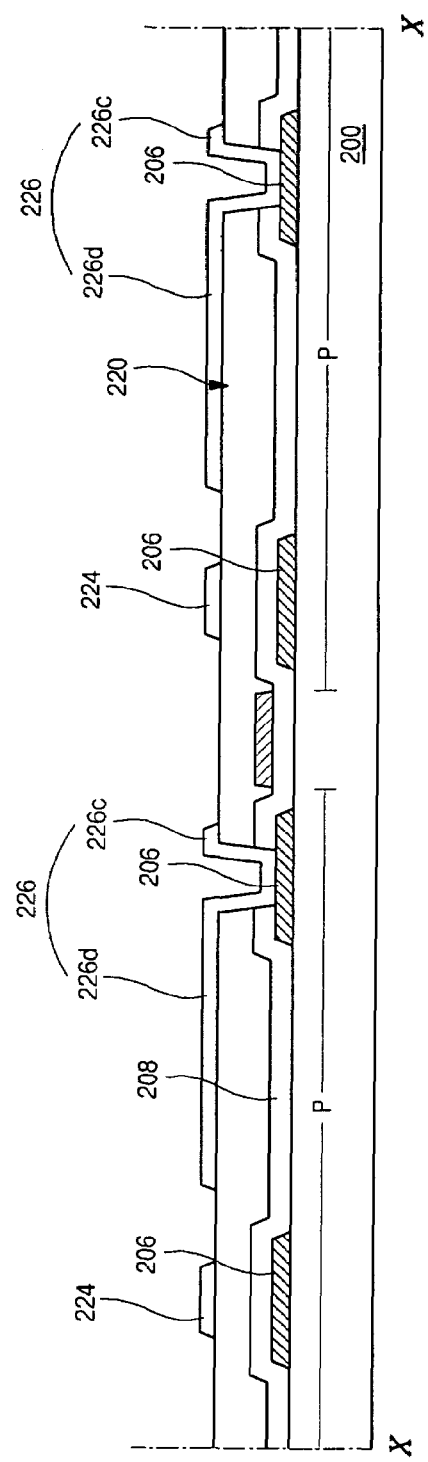

As shown in FIG. 9D and FIG. 10D, a pixel electrode 224 and a common electrode 226 are formed on the passivation layer 220 by depositing a transparent conductive material substantially on an entire surface of the substrate 200 including the passivation layer 220 and then patterning it. The transparent conductive material may include one of a transparent conductive metallic group including indium tin oxide (ITO) and indium zinc oxide (IZO). The pixel electrode 224 is connected to the drain electrode 216 through the drain contact hole 222, and the common electrode 226 is connected to the common line 206 through the common line contact holes 223.

The pixel electrode 224 includes first and second vertical portions 224a and 224c and first and second horizontal portions 224b and 224d. The common electrode 226 includes first and second vertical portions 226a and 226c and first and second horizontal portions 226b and 226d. The first vertical portion of the pixel electrode 224a and the first vertical portion of the common electrode 226a may be disposed at one side of the pixel region P parallel to the data line 218, and the second vertical portion of the pixel electrode 224c and the second vertical portion of the common electrode 226c may be disposed at the other side of the pixel region P parallel to the data line 218. The first horizontal portions of the pixel electrode 224b extend from the first vertical portion of the pixel electrode 224a perpendicularly to the data line 218, and the second horizontal portions of the pixel electrode 224d extend from the second vertical portion of the pixel electrode 224c perpendicularly to the data line 218. The first horizontal portions of the common electrode 226b extend from the first vertical portion of the common electrode 226a perpendicularly to the data line 218, and the second horizontal portions of the common electrode 226d extend from the second vertical portion of the common electrode 226c perpendicularly to the data line 218. The first and second vertical portions of the pixel electrode 224a and 224c and the first and second vertical portions of the common electrode 226a and 226c overlap the common line 206. The first and second vertical portions of the common electrode 226a and 226c are connected to the common line 206 through the common line contact holes 223. The first and second horizontal portions of the pixel electrode 224b and 224d have at least one portion in common.

Therefore, in accordance with an embodiment of the invention, since the common electrode and the pixel electrode are formed of a transparent conductive material, the aperture ratio is increased, and the brightness of the device is improved. In addition, in accordance with an embodiment of the invention, the common and pixel electrodes are substantially parallel to the gate line, to thereby increase the viewing angles in the up-down direction. Moreover, in accordance with an embodiment of the invention, the parasitic capacitances are equal at both sides of the data line. Thus, defects, such as flicker or vertical line defects, are prevented, and high qualities are obtained in the displayed images.

It will be apparent to those skilled in the art that various modifications and variations can be made in the in-plane switching ("IPS") mode liquid crystal display device and the method of manufacturing the same of embodiments of the invention without departing from the spirit or scope of the invention. Thus, it is intended that embodiments of the invention cover the modifications and variations of this invention provided they come within the scope of the appended claims and their equivalents.

What is claimed is:

1. A substrate for a liquid crystal display device, comprising:
    a substrate;
    a gate line along a first direction on the substrate;
    a data line along a second direction on the substrate, the data line crossing the gate line to define a pixel region, the pixel region having first and second sides opposing one another and first and second areas along the second direction;
    a thin film transistor on the substrate, the thin film transistor electrically connected to the gate and data lines;
    a pixel electrode on the substrate and electrically connected to the thin film transistor, the pixel electrode including a first vertical part and a second vertical part, the first vertical part at the first side within the first area and the second vertical part at the second side within the second area; and
    a common electrode on the substrate, the common electrode including a first vertical portion and a second vertical portion, the first vertical portion at the first side within the second area and the second vertical portion at the second side within the first area,
    wherein the first vertical part and the first vertical portion are disposed in a line parallel to the data line, and the second vertical part and the second vertical portion are disposed in a line parallel to the data line.

2. The substrate according to claim 1, wherein the pixel electrode includes first horizontal parts and second horizontal parts, the first and second horizontal parts respectively extending from the first and second vertical parts along the first direction, and
    wherein the common electrode includes first horizontal portions and second horizontal portions, the first and second horizontal portions respectively extending from the first and second vertical portions along the first direction.

3. The substrate according to claim 2, wherein the first horizontal parts alternate with the second horizontal portions within the first area, and the first horizontal portions alternate with the second horizontal parts within the second area.

4. The substrate according to claim 3, wherein the first horizontal parts and second horizontal parts have at least one portion in common.

5. The substrate according to claim 1, wherein the first and second vertical parts are disposed at opposite sides of the pixel region along a first diagonal direction, and the first and second vertical portions are disposed at opposite sides of the pixel region along a second diagonal direction.

6. The substrate according to claim 1, further comprising a common line on the substrate, the common electrode electrically connected to the common line.

7. The substrate according to claim 6, wherein the common line overlaps the first and second vertical parts and the first and second vertical portions.

8. The substrate according to claim 7, wherein the common line includes a loop portion having a shape corresponding to a shape of the pixel region.

9. The substrate according to claim 7, wherein the first and second vertical portions contact the common line through contact holes.

10. The substrate according to claim 1, wherein the thin film transistor includes a gate electrode, an active layer, a source electrode and a drain electrode.

11. The substrate according to claim 1, wherein the common electrode and the pixel electrode include a transparent conductive material.

12. A substrate for a liquid crystal display device, comprising:
a substrate;
gate lines along a first direction on the substrate;
data lines along a second direction on the substrate, the data lines crossing the gate lines to define pixel regions, each of the pixel regions having first and second areas along the second direction;
a thin film transistor on the substrate at each crossing point of the gate and data lines;
a pixel electrode on the substrate in each of the pixel regions, the pixel electrode electrically connected to the thin film transistor and including a first vertical part and a second vertical part; and
a common electrode on the substrate in each of the pixel regions, the common electrode including a first vertical portion and a second vertical portion, the first vertical part and the first vertical portion at a first side of each of the data lines, and the second vertical part and the second vertical portion at a second side of each of the data lines,
wherein the first vertical part and the first vertical portion are disposed in a line parallel to the data lines, and the second vertical part and the second vertical portion are disposed in a line parallel to the data lines.

13. The substrate according to claim 12, wherein the first vertical part and the second vertical portion are disposed in the first area, and the first vertical portion and the second vertical part are disposed in the second area.

14. A substrate for a liquid crystal display device, comprising:
a substrate;
a gate line along a first direction on the substrate;
a data line along a second direction and crossing the gate line to define a pixel region;
a thin film transistor on the substrate and electrically connected to the gate and data lines;
a pixel electrode in the pixel region and connected to the thin film transistor; and
a common electrode in the pixel region, wherein a first capacitance between the data line and the common and pixel electrodes at a first side of the data line is substantially equal to a second capacitance between the data line and the common and pixel electrodes at a second side of the data line,
wherein a first vertical part of the pixel electrode and a first vertical portion of the common electrode are disposed in a line parallel to the data line, and a second vertical part of the pixel electrode and a second vertical portion of the common electrode are disposed in a line parallel to the data line.

15. A method of manufacturing a substrate for a liquid crystal display device, comprising:
forming a gate line along a first direction on a substrate;
forming a data line along a second direction, the data line crossing the gate line to define a pixel region, the pixel region having first and second sides opposing one another and first and second areas along the second direction;
forming a thin film transistor electrically connected to the gate and data lines;
forming a first vertical part of a pixel electrode on the substrate at the first side within the first area;
forming a second vertical part of the pixel electrode on the substrate at the second side within the second area, the pixel electrode electrically connected to the thin film transistor;
forming a first vertical portion of a common electrode on the substrate at the first side within the second area; and
forming a second vertical portion of the common electrode on the substrate at the second side within the first area,
wherein the first vertical part and the first vertical portion are disposed in a line parallel to the data line, and the second vertical part and the second vertical portion are disposed in a line parallel to the data line.

16. The method according to claim 15, further comprising:
forming first horizontal parts of the pixel electrode extending from the first vertical part along the first direction;
forming first horizontal portions of the common electrode extending from the first vertical portion along the first direction;
forming second horizontal parts of the pixel electrode extending from the second vertical part along the first direction; and
forming second horizontal portions of the common electrode extending from the second vertical portion along the first direction.

17. The method according to claim 16, wherein the first horizontal parts are formed alternating with the second horizontal portions in the first area, and the first horizontal portions are formed alternating with the second horizontal parts in the second area.

18. The method according to claim 17, wherein the first horizontal parts and second horizontal parts have at least one portion in common.

19. The method according to claim 15, wherein the first and second vertical parts are disposed at opposite sides of the pixel region along a first diagonal direction, and the first and second vertical portions are disposed at opposite sides of the pixel region along a second diagonal direction.

20. The method according to claim 15, further comprising forming a common line on the substrate, the common line overlapping the first and second vertical parts and the first and second vertical portions.

21. The method according to claim 20, wherein the first and second vertical portions contact the common line through contact holes.

22. The method according to claim 15, wherein the forming the thin film transistor includes forming a gate electrode, forming a gate insulating layer, forming an active layer, forming an ohmic contact layer, and forming a source electrode and a drain electrode.

23. The method according to claim 15, wherein the forming the pixel electrode and forming the common electrode are simultaneously performed.

24. The method according to claim 23, wherein the common electrode and the pixel electrode are formed of a transparent conductive material.

25. A method of manufacturing a substrate for a liquid crystal display device, comprising:
forming a gate line, a gate electrode, and a common line on a substrate, the gate line and the common line extending along a first direction;
forming a gate insulating layer on the gate line, the gate electrode and the common line;
forming an active layer and an ohmic contact layer on the gate insulating layer over the gate electrode;
forming a data line, a source electrode and a drain electrode on the ohmic contact layer, the data line extending along a second direction and crossing the gate line to define a pixel region, the pixel region including first and second areas along the second direction;

forming a passivation layer covering the data line, the source electrode and the drain electrode, the passivation layer including a first contact hole and second contact holes, the first contact hole exposing the drain electrode, the second contact holes exposing the common line; and forming a pixel electrode and a common electrode in the pixel region on the passivation layer, the pixel electrode including a first vertical part and a second vertical part, the common electrode including a first vertical portion and a second vertical portion, wherein the first vertical part and the first vertical portion are formed at a first side of the data line, and the second vertical part and the second vertical portion are formed at a second side of the data line, wherein the first vertical part and the first vertical portion are disposed in a line parallel to the data line, and the second vertical part and the second vertical portion are disposed in a line parallel to the data line.

26. The method according to claim 25, wherein the pixel electrode includes first horizontal parts and second horizontal parts and the common electrode further includes first horizontal portions and second horizontal portions, wherein the first horizontal parts extend from the first vertical part along the first direction, the first horizontal portions extend from the first vertical portion along the first direction, the second horizontal parts extend from the second vertical part along the first direction, and the second horizontal portions extend from the second vertical portion along the first direction.

27. The method according to claim 26, wherein the first horizontal parts and second horizontal parts have at least one portion in common.

28. The method according to claim 25, wherein the pixel electrode is connected to the drain electrode through the first contact hole, and the common electrode is connected to the common line through the second contact holes.

29. The method according to claim 25, wherein the first and second vertical parts are disposed at opposite sides of the pixel region along a first diagonal direction, and the first and second vertical portions are disposed at opposite sides of the pixel region along a second diagonal direction.

* * * * *